United States Patent
Wang

(10) Patent No.: US 10,493,487 B2
(45) Date of Patent: Dec. 3, 2019

(54) COLOR FILTER SUBSTRATE, TOUCH PANEL AND CURING DEVICE

(71) Applicants: BOE TECHNOLOGY GROUP CO., LTD., Beijing (CN); BOE (HEBEI) MOBILE DISPLAY TECHNOLOGY CO., LTD., Gu'An, Hebei (CN)

(72) Inventor: Dapeng Wang, Beijing (CN)

(73) Assignees: BOE TECHNOLOGY GROUP CO., LTD., Beijing (CN); BOE (HEBEI) MOBILE DISPLAY TECHNOLOGY CO., LTD., Gu'an, Hebei (CN)

(*) Notice: Subject to any disclaimer, the term of this patent is extended or adjusted under 35 U.S.C. 154(b) by 0 days.

(21) Appl. No.: 15/130,561

(22) Filed: Apr. 15, 2016

(65) Prior Publication Data

US 2016/0370515 A1    Dec. 22, 2016

(30) Foreign Application Priority Data

Jun. 17, 2015   (CN) .......................... 2015 1 0338307

(51) Int. Cl.
*B05D 3/06* (2006.01)
*G06F 3/041* (2006.01)
(Continued)

(52) U.S. Cl.
CPC .............. *B05D 3/067* (2013.01); *G06F 3/041* (2013.01); *G02B 5/201* (2013.01);
(Continued)

(58) Field of Classification Search
CPC ........... G06F 2203/04103; G06F 3/041; G06F 3/0412; G06F 3/0416; G02F 1/13338;
(Continued)

(56) References Cited

U.S. PATENT DOCUMENTS 6,424,394 B1 * 7/2002 Morii ................ G02F 1/133512
349/110
2007/0273821 A1 * 11/2007 Liou ..................... G02F 1/1339
349/153
(Continued)

FOREIGN PATENT DOCUMENTS

CN    201841100 U    5/2011
CN    102339159 A    2/2012
(Continued)

OTHER PUBLICATIONS

First Office Action regarding Chinese Application No. 201510338307.7, dated May 31, 2017. Translation provided by Dragon Intellectual Property Law Firm.
(Continued)

*Primary Examiner* — Jade R Chwasz
(74) *Attorney, Agent, or Firm* — Harness, Dickey & Pierce, P.L.C.

(57) ABSTRACT

A color filter substrate is provided, which includes a main body, and a touch flexible printed circuit (TFPC) and a black matrix arranged on the main body. The TFPC includes one or more light-transmissible regions, and an orthogonal projection of each light-transmissible region onto the main body does not overlap an orthogonal projection of the black matrix onto the main body.

18 Claims, 2 Drawing Sheets

(51) Int. Cl.
*G02B 5/20* (2006.01)
*G02F 1/1333* (2006.01)

(52) U.S. Cl.
CPC ...... *G02F 1/13338* (2013.01); *G02F 2202/28* (2013.01); *G06F 2203/04103* (2013.01)

(58) Field of Classification Search
CPC ......... G02F 1/133514; G02F 1/134309; G02F 1/13439; G02F 1/133516; G02F 2001/136295; G02F 2202/28; G02F 1/133512; G02F 1/13394; G02F 2201/52; G02F 2202/023; H01L 27/323; G02B 5/201; G02B 5/003; G02B 1/14; G02B 5/22; G02B 5/223; G02B 5/285; G02B 1/111; G02B 7/006; G02B 5/20; B05D 3/067
USPC ....... 359/893, 580, 581, 582, 586, 589, 590, 359/890, 891
See application file for complete search history.

(56) References Cited

U.S. PATENT DOCUMENTS

| | | | |
|---|---|---|---|
| 2013/0154949 A1* | 6/2013 | Jamshidi Roudbari | ................... G02F 1/1339 345/173 |
| 2013/0240116 A1* | 9/2013 | Nonaka | ............. B29D 11/0073 156/64 |
| 2014/0009400 A1 | 1/2014 | Poorter et al. | |
| 2014/0043569 A1 | 2/2014 | Yabuta et al. | |
| 2014/0057519 A1 | 2/2014 | Fang | |
| 2014/0374006 A1* | 12/2014 | Park | ..................... G02F 1/1303 156/108 |
| 2016/0252987 A1 | 9/2016 | Wang | |

FOREIGN PATENT DOCUMENTS

| | | |
|---|---|---|
| CN | 102830552 A | 12/2012 |
| CN | 103493119 A | 1/2014 |
| CN | 103529578 A | 1/2014 |
| CN | 104102383 A | 10/2014 |
| CN | 104235642 A | 12/2014 |
| CN | 204194229 U | 3/2015 |
| KR | 20140062962 A | 5/2014 |

OTHER PUBLICATIONS

Second Office Action regarding Chinese Application No. 201510338307. 7, dated Nov. 28, 2017. Translation provided by Dragon Intellectual Property Law Firm.

Third Chinese Office Action regarding Application No. 201510338307.7 dated May 21, 2018. Translation provided by Dragon Intellectual Property Law Firm.

* cited by examiner

COLOR FILTER SUBSTRATE, TOUCH PANEL AND CURING DEVICE

CROSS-REFERENCE TO RELATED APPLICATION

The present application claims a priority of the Chinese patent application No. 201510338307.7 filed on Jun. 17, 2015, which is incorporated herein by reference in its entirety.

TECHNICAL FIELD

The present disclosure relates to the field of display technology, in particular to a color filter substrate, a touch panel and a curing device.

BACKGROUND

Currently, most of the liquid crystal display devices available in the market, e.g., mobile phones and flat-panel computers, have a touch function. For most of these liquid crystal display devices, the touch function and a display function are integrated into a panel, and this panel including both the touch function and the display function is called as a touch panel.

Usually, in the related art, the touch panel includes, from top to bottom, a glass cover plate, a polarizer, a color filter substrate and an array substrate (a liquid crystal layer is arranged between the color filter substrate and the array substrate). As shown in FIG. 1, a touch flexible printed circuit (TFPC) 2 is arranged at one end of an upper surface of the color filter substrate 1, black matrices 3 surround the color filter substrate 1 and a lower surface of the TFPC 2, and a reinforcing adhesive layer 4 is arranged on the TFPC 2. During the assembling, usually a liquid adhesive (a liquid optical adhesive) is coated onto the TFPC 2, and then the glass cover plate is adhered to the TFPC 2 through the liquid adhesive. The liquid adhesive is irradiated by a light-emitting diode (LED) lamp from a side of the adhered glass cover plate and the TFPC 2 (i.e. in a direction shown by a dotted arrow in FIG. 1), so as to cure the liquid adhesive and enable the liquid adhesive to be in a stable state.

However, the inventor finds that, when the liquid adhesive is irradiated and cured from the side, merely a portion of the liquid adhesive is irradiated, and thus the liquid adhesive cannot be cured completely. At this time, it is impossible for the liquid adhesive to be in the stable state to a full extent, and a part of the liquid adhesive may be left. As a result, the leakage of the liquid adhesive may occur, and the quality and appearance of the resultant liquid crystal display device may be adversely affected.

SUMMARY

An object of the present disclosure is to provide a color filter substrate, a touch panel and a curing device, so as to prevent the adhesive from leaking out of the touch panel due to its liquid state during the curing.

In one aspect, the present disclosure provides in some embodiments a color filter substrate, including a main body, and a TFPC and a black matrix arranged on the main body. The TFPC includes one or more light-transmissible regions, and an orthogonal projection of each light-transmissible region onto the main body does not overlap an orthogonal projection of the black matrix onto the main body.

According to the color filter substrate in the embodiments of the present disclosure, the TFPC of the color filter substrate includes the light-transmissible regions, and the orthogonal projection of the light-transmissible region onto the main body does not overlap that of the black matrix onto the main body. During the process of assembling the touch panel, when a liquid adhesive coated at the light-transmissible regions of the TFPC is irradiated and cured by a light source, whole of the liquid adhesive may be irradiated completely. As compared with the related art where the liquid adhesive cannot be cured completely because the TFPC is nontransparent and may be shielded by the black matrix in a projection direction orthogonal to the color filter main body, whole of the liquid adhesive in the embodiments of the present disclosure may be irradiated and then cured into a solid state completely, so as to be in a stable state to the full extent. As a result, it is able to prevent the adhesive from leaking out of the touch panel due to its liquid state, thereby to improve the quality and the appearance of a liquid crystal display device.

Alternatively, the TFPC includes a plurality of light-transmissible regions spaced apart from each other.

Alternatively, each light-transmissible region includes a hollow region and a light-transmissible film covering the hollow region.

Alternatively, the light-transmissible film is made of organic plastics.

Alternatively, the light-transmissible film is made of polyethylene terephthalate (PET) or polycarbonate (PC).

In another aspect, the present disclosure provides in some embodiments a touch panel, so as to prevent the adhesive from leaking out of the touch panel due to its liquid state during the curing. The touch panel includes an array substrate and the above-mentioned color filter substrate arranged opposite to each other. Such touch panel has advantages similar to the above-mentioned advantages of the color filter substrate, and therefore a description thereof is omitted herein.

Alternatively, a region of the array substrate corresponding to a TFPC of the color filter substrate is a transparent region where no line is arranged.

In yet another aspect, the present disclosure provides in some embodiments a device for curing a liquid adhesive during manufacture of a touch panel, so as to prevent the adhesive from leaking out of the touch panel due to its liquid state during the curing. The device includes an area light source capable of emitting ultraviolet light, and one or more light guide elements arranged opposite to a light-exiting surface of the area light source and configured to guide the ultraviolet light emitted from the area light source toward one or more light-transmissible regions of a TFPC of a color filter substrate of the touch panel, so as to irradiate and cure the liquid adhesive coated at the light-transmissible regions of the TFPC.

According to the curing device in the embodiments of the present disclosure, during the process of curing the liquid adhesive in the color filter substrate and the touch panel, the ultraviolet light emitted from the area light source may be guided by the light guide elements toward the liquid adhesive coated at the light-transmissible region of the TFPC, so as to irradiate and cure the liquid adhesive and change the liquid adhesive into a solid state completely, thereby to enable whole of the liquid adhesive to be in a stable state. As a result, it is able to prevent the adhesive from leaking out of the touch panel due to its liquid state, thereby to improve the quality and the appearance of the liquid crystal display device.

Alternatively, the area light source is a metal halide lamp.

Alternatively, there is a plurality of light guide elements arranged opposite to the light-exiting surface of the area light source, and the ultraviolet light emitted from the area light source is transmitted to the light guide elements via one or more optical fibers.

Alternatively, the light-transmissible regions, the light guide elements and the optical fibers are arranged at an identical amount, and the ultraviolet light is transmitted to a corresponding one of the light guide elements via a corresponding one of the optical fibers, so as to irradiate and cure the liquid adhesive coated at a corresponding one of the light-transmissible regions.

Alternatively, each light guide element includes two light guide members connected at their ends, each light guide member is provided with a light guide hole, and a reflector is arranged at a junction between the two light guide holes in vertical communication with each other.

Figure 1:
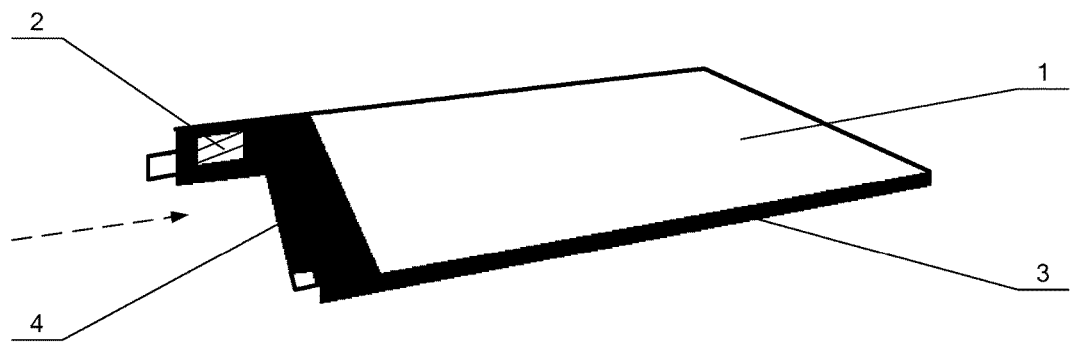
FIG. 1 is a schematic view showing a color filter substrate in related art.

REFERENCE SIGN LIST 1 color filter substrate
2 TFPC
3 black matrix
4 reinforcing adhesive
21 light-transmissible region
22 non-light-transmissible region
5 light guide element

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 2:
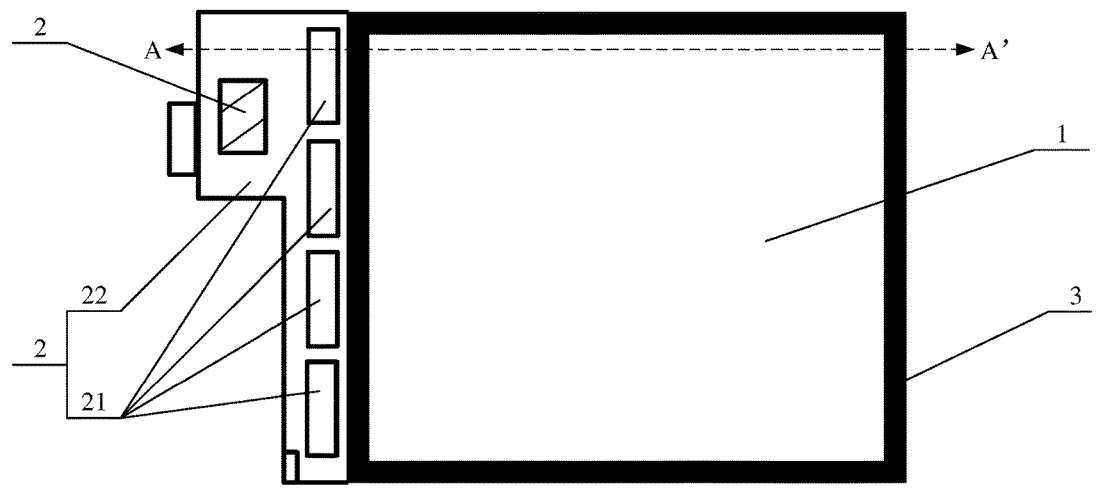
FIG. 2 is a schematic view showing a color filter substrate according to one embodiment of the present disclosure.

As shown in FIG. 2, the present disclosure provides in some embodiments a color filter substrate 1, on which a TFPC 2 and a black matrix 3 are arranged. The TFPC 2 includes a light-transmissible region 21, and an orthogonal projection of the light-transmissible region 21 onto the color filter substrate 1 does not overlap an orthogonal projection of the black matrix onto the color filter substrate 1.

According to the color filter substrate in the embodiments of the present disclosure, the TFPC of the color filter substrate includes the light-transmissible region, and the orthogonal projection of the light-transmissible region onto the color filter substrate does not overlap that of the black matrix onto the color filter substrate. As a result, during a process of assembling a touch panel, when a liquid adhesive coated at the light-transmissible region of the TFPC is irradiated and cured by a light source, whole of the liquid adhesive may be irradiated completely. As compared with the related art where the liquid adhesive cannot be cured completely because the TFPC is nontransparent and may be shielded by the black matrix in a projection direction orthogonal to the color filter, whole of the liquid adhesive in the embodiments of the present disclosure may be irradiated and then cured into a solid state completely, so as to be in a stable state to the full extent. As a result, it is able to prevent the adhesive from leaking out of the touch panel due to its liquid state, thereby to improve the quality and the appearance of a liquid crystal display device.

It should be appreciated that, as compared with the color filter substrate in the related art, there is no non-light-transmissible reinforcing adhesive 4 at a non-display region for the color filter substrate 1 in the embodiments of the present disclosure, and the black matrix 3 at a lower level is retracted toward a display region of the color filter substrate 1 so as not to shield the TFPC 2. In addition, the TFPC 2 includes the light-transmissible region 21. Hence, the liquid adhesive may be irradiated by an LED lamp in a direction from a bottom to a top of the TFPC 2, so as to completely cure the liquid adhesive, thereby to enable whole of the liquid adhesive to be in a stable state.

In order to facilitate the arrangement of lines of the TFPC 2, as shown in FIG. 2, the TFPC 2 may optionally include a plurality of light-transmissible regions 21 spaced apart from each other. In this way, the lines may be arranged at a non-light-transmissible region 22 of the TFPC 2 conveniently, and meanwhile whole of the liquid adhesive at the light-transmissible regions 21 may be irradiated completely.

During the actual application, the light-transmissible region 21 of the TFPC 2 shall be designed in such a manner as to allow the light to pass therethrough and support the liquid adhesive. Hence, the light-transmissible region 21 may include a hollow region, and a light-transmissible film covering the hollow region and configured to allow the light to be transmitted therethrough and support the liquid adhesive. To be specific, the light-transmissible film may be made of organic plastics, e.g., PET or PC.

Figure 4:
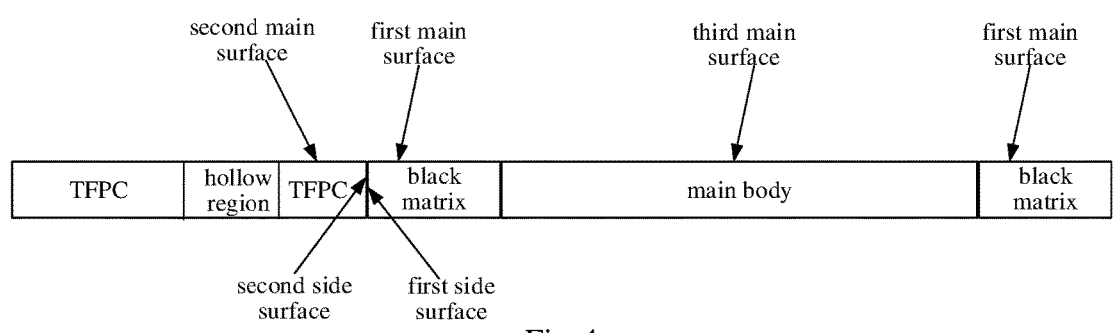
FIG. 4 is a cross-sectional view of the color filter substrate along a line AA' of FIG. 2 according to one embodiment of the present disclosure.

FIG. 4 is a cross-sectional view of the color filter substrate along a line AA' of FIG. 2 according to one embodiment of the present disclosure. As shown in FIG. 4, a fist side surface of the black matrix is in direct physical contact with a second side surface of the TFPC, the first side surface of the black matrix is perpendicularly connected to a first main surface of the black matrix, the second side surface of the TFPC is perpendicularly connected to a second main surface of the TFPC, the first main surface of the black matrix surrounds a third main surface of the main body, and the hollow region penetrates through the second main surface.

The present disclosure further provides in some embodiments a touch panel, which includes an array substrate and the above-mentioned color filter substrate 1 arranged opposite to each other. A region of the array substrate corresponding to the TFPC 2 of the color filter substrate 1 is a transparent region where no line is arranged.

According to the touch panel in the embodiments of the present disclosure, the region of the array substrate corresponding to the TFPC 2 of the color filter substrate 1 is a transparent region where no line is arranged, and the non-display region of the color filter substrate 1 is a light-transmissible region, so the non-display region of the touch panel may also be light transmissible. As a result, during the process of curing the liquid adhesive at the non-display region of the touch panel, whole of the liquid adhesive may be irradiated and cured into a solid state completely, and thereby achieve a stable state to the full extent. As a result, it is able to prevent the adhesive from leaking out of the touch panel due to its liquid state, thereby to improve the quality and appearance of the liquid crystal display device.

Figure 3:
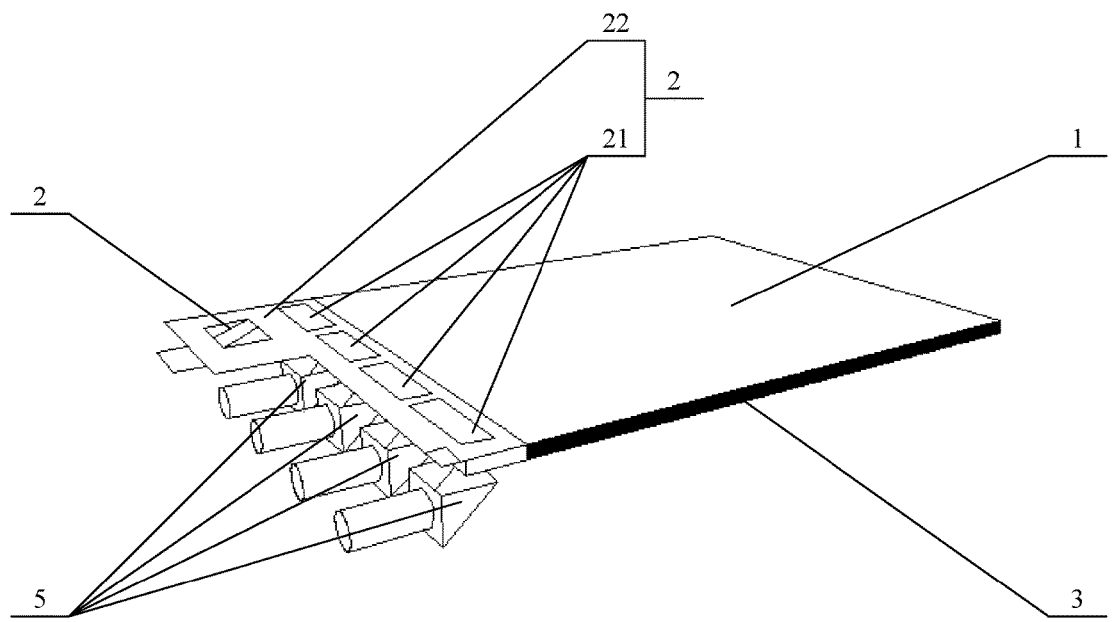
FIG. 3 is a schematic view showing a curing device for the color filter substrate or a liquid crystal module according to one embodiment of the present disclosure.

The present disclosure further provides in some embodiments a device for curing the liquid adhesive during the manufacture of the touch panel. As shown in FIG. 3, the curing device includes an area light source (not shown) capable of emitting ultraviolet light, and a light guide element 5 arranged opposite to a light-exiting surface of the area light source and configured to guide the ultraviolet light emitted from the area light source toward the light-transmissible region 21 of the TFPC 2 of the color filter substrate 1, so as to irradiate and cure the liquid adhesive coated at the light-transmissible region 21 of the TFPC 2.

According to the curing device in the embodiments of the present disclosure, during the process of curing the liquid adhesive on the color filter substrate and the touch panel, the ultraviolet light emitted from the area light source may be guided by the light guide elements toward the liquid adhesive coated at the light-transmissible region of the TFPC, so as to irradiate and cure the liquid adhesive and change the liquid adhesive into a solid state completely, thereby to enable whole of the liquid adhesive to be in a stable state. As a result, it is able to prevent the adhesive from leaking out of the touch panel due to its liquid state, thereby to improve the quality and the appearance of the liquid crystal display device.

As compared with the related art where an LED lamp is used as a light source, in the embodiments of the present disclosure, the area light source capable of emitting ultraviolet light may be a metal halide lamp. In this way, the area light source may transmit the light within a wider wavelength range, so as to cure the liquid adhesive in a better manner.

As shown in FIG. 3, for corresponding to the plurality of light-transmissible regions 21 included in the TFPC 2 of the color filter substrate 1, there may be a plurality of light guide elements 5 arranged opposite to the light-exiting surface of the area light source, and optionally each of the light guide elements 5 corresponds to one light-transmissible region 21, so as to irradiate and cure the liquid adhesive in a better manner. In order to prevent the ultraviolet light from energy loss during the transmission, the ultraviolet light emitted from the area light source may be transmitted to the respective light guide elements 5 via an optical fiber. In this way, the area light source formed by the metal halide lamp may be converted into a plurality of point light sources in one-to-one correspondence with the light guide elements 5 and the light-transmissible regions 21.

In order to facilitate the arrangement of the curing device, the color filter substrate 1 and the touch panel in a workshop, as shown in FIG. 3, the curing device and a member to be cured are usually arranged side by side in a horizontal direction, i.e., the area light source and the light guide element 5 are horizontally arranged below the TFPC 2. In this regard, the light guide element 5 of the curing device may include two light guide members, an end of one of the two light guide members is connected to an end of the other one of the two light guide members, each light guide member is provided with a light guide hole, and a reflector is arranged at a junction between the two light guide holes in vertical communication with each other. The reflector is configured to vertically guide the ultraviolet light emitted from the area light source in the horizontal direction toward the light-transmissible region 21 of the TFPC 2. As a result, under the effect of the reflector, the color filter substrate 1 or the touch panel may be vertically irradiated by the ultraviolet light emitted in the horizontal direction from the bottom up.

In addition, as shown in FIG. 1, there are usually three curing stages for curing the liquid adhesive in the related art, i.e., a pre-curing stage in which an entire region (i.e., the display region and the non-display region) of the color filter substrate 1 is irradiated from the bottom up, a primary curing stage in which the display region of the color filter substrate 1 is irradiated from the top down, and a secondary curing stage in which the non-display region of the color filter substrate 1 is irradiated from the side. However, in the embodiments of the present disclosure, as shown in FIG. 3, there are merely two curing stages during the process of curing the color filter substrate, i.e., a pre-curing stage in which the entire region (i.e., the display region and the non-display region) of the color filter substrate 1 is irradiated from the bottom up, and a curing stage in which the display region of the color filter substrate 1 is irradiated from the top down. In other words, the liquid adhesive in the non-display region of the color filter substrate 1 is irradiated and cured in the pre-curing stage, and the above-mentioned secondary curing stage is omitted. As a result, it is able to reduce the curing cost and the labor cost, and to improve the curing efficiency.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A color filter substrate, comprising a main body, and a touch flexible printed circuit (TFPC) and a black matrix arranged on the main body, wherein one or more light-transmissible regions are arranged within the TFPC and spaced apart from the black matrix, and an orthogonal projection of each light-transmissible region onto the main body does not overlap an orthogonal projection of the black matrix onto the main body, wherein each light-transmissible region comprises a hollow region penetrating through the TFPC and a light-transmissible film covering merely the hollow region, the black matrix and the TFPC are arranged side-by-side in an identical layer in the color filter substrate, and the black matrix is in direct physical contact with the TFPC;

a first side surface of the black matrix is in direct physical contact with a second side surface of the TFPC, the first side surface of the black matrix is perpendicularly connected to a first main surface of the black matrix, the second side surface of the TFPC is perpendicularly connected to a second main surface of the TFPC, the first main surface of the black matrix surrounds a third main surface of the main body, and the hollow region penetrates through the second main surface.

2. The color filter substrate according to claim 1, wherein the one or more light-transmissible regions comprise a plurality of light-transmissible regions spaced apart from each other.

3. The color filter substrate according to claim 2, wherein the light-transmissible film is made of organic plastics.

4. The color filter substrate according to claim 1, wherein the light-transmissible film is made of organic plastics.

5. The color filter substrate according to claim 4, wherein the light-transmissible film is made of polyethylene terephthalate (PET) or polycarbonate (PC).

6. A touch panel, comprising an array substrate and the color filter substrate according to claim 1 arranged opposite to each other.

7. The touch panel according to claim 6, wherein a region of the array substrate corresponding to the TFPC of the color filter substrate is a transparent region where no line is arranged.

8. The touch panel according to claim 6, wherein the one or more light-transmissible regions comprise a plurality of light-transmissible regions spaced apart from each other.

9. The touch panel according to claim 8, wherein the light-transmissible film is made of organic plastics.

10. The color filter substrate according to claim 1, wherein the orthogonal projection of the black matrix onto the main body does not overlap an orthogonal projection of the TFPC onto the main body, to prevent the black matrix from shielding the TFPC.

11. A device for curing a liquid adhesive during a process of manufacturing a touch panel, comprising:
an area light source capable of emitting ultraviolet light; and
one or more light guide elements arranged opposite to a light-exiting surface of the area light source and configured to guide the ultraviolet light emitted from the area light source toward one or more light-transmissible regions arranged within a touch flexible printed circuit (TFPC) of a color filter substrate of the touch panel, so as to irradiate and cure the liquid adhesive coated at the light-transmissible regions of the TFPC,
wherein the one or more light-transmissible regions are spaced apart from a black matrix of the color filter substrate, each light-transmissible region comprises a hollow region penetrating through the TFPC and a light-transmissible film covering merely the hollow region, the black matrix and the TFPC are arranged side-by-side in an identical layer in the color filter substrate, and the black matrix is in direct physical contact with the TFPC;
a first side surface of the black matrix is in direct physical contact with a second side surface of the TFPC, the first side surface of the black matrix is perpendicularly connected to a first main surface of the black matrix, the second side surface of the TFPC is perpendicularly connected to a second main surface of the TFPC, the first main surface of the black matrix surrounds a third main surface of the main body, and the hollow region penetrates through the second main surface.

12. The device according to claim 11, wherein the area light source is a metal halide lamp.

13. The device according to claim 12, wherein there is a plurality of light guide elements arranged opposite to the light-exiting surface of the area light source, and the ultraviolet light emitted from the area light source is transmitted to the light guide elements via one or more optical fibers.

14. The device according to claim 13, wherein the light-transmissible regions, the light guide elements and the optical fibers are arranged in equal amount, and the ultraviolet light is transmitted to each of the light guide elements via a corresponding one of the optical fibers, so as to irradiate and cure the liquid adhesive coated at a corresponding one of the light-transmissible regions.

15. The device according to claim 13, wherein each of the light guide elements comprises two light guide members, an end of one of the two light guide members is connected to an end of the other one of the two light guide members, the two light guide members are provided with two light guide holes respectively, the two light guide holes are in vertical communication with each other, and a reflector is arranged at a junction between the two light guide holes.

16. The device according to claim 11, wherein there is a plurality of light guide elements arranged opposite to the light-exiting surface of the area light source, and the ultraviolet light emitted from the area light source is transmitted to the light guide elements via one or more optical fibers.

17. The device according to claim 16, wherein the light-transmissible regions, the light guide elements and the optical fibers are arranged in equal amount, and the ultraviolet light is transmitted to each of the light guide elements via a corresponding one of the optical fibers, so as to irradiate and cure the liquid adhesive coated at a corresponding one of the light-transmissible regions.

18. The device according to claim 16, wherein each of the light guide elements comprises two light guide members, an end of one of the two light guide members is connected to an end of the other one of the two light guide members, the two light guide members are provided with two light guide holes respectively, the two light guide holes are in vertical communication with each other, and a reflector is arranged at a junction between the two light guide holes.

* * * * *